Feb. 13, 1968  M. DANGAUTHIER  3,368,840
SEAT UNIT
Filed Oct. 14, 1966  2 Sheets-Sheet 1
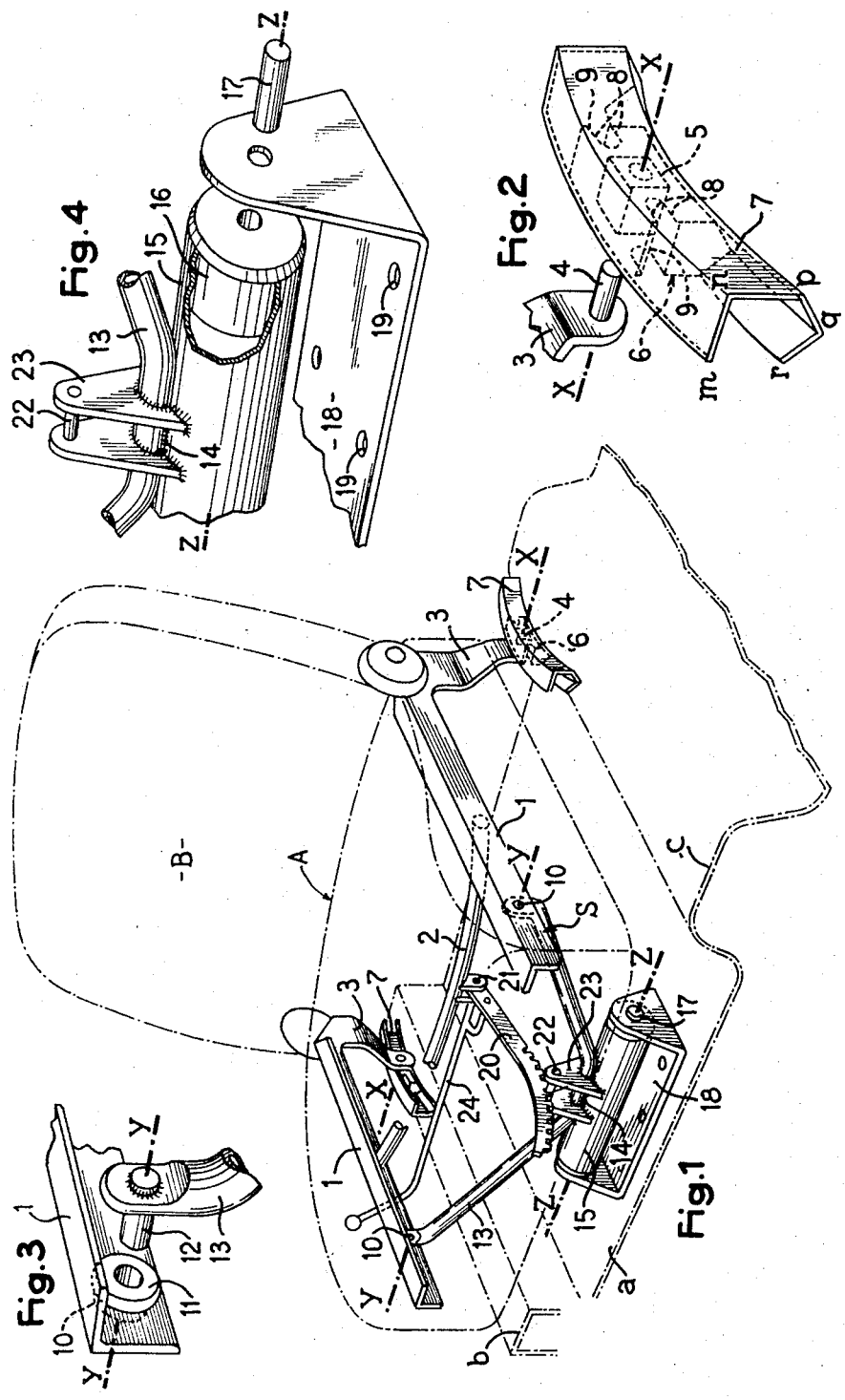

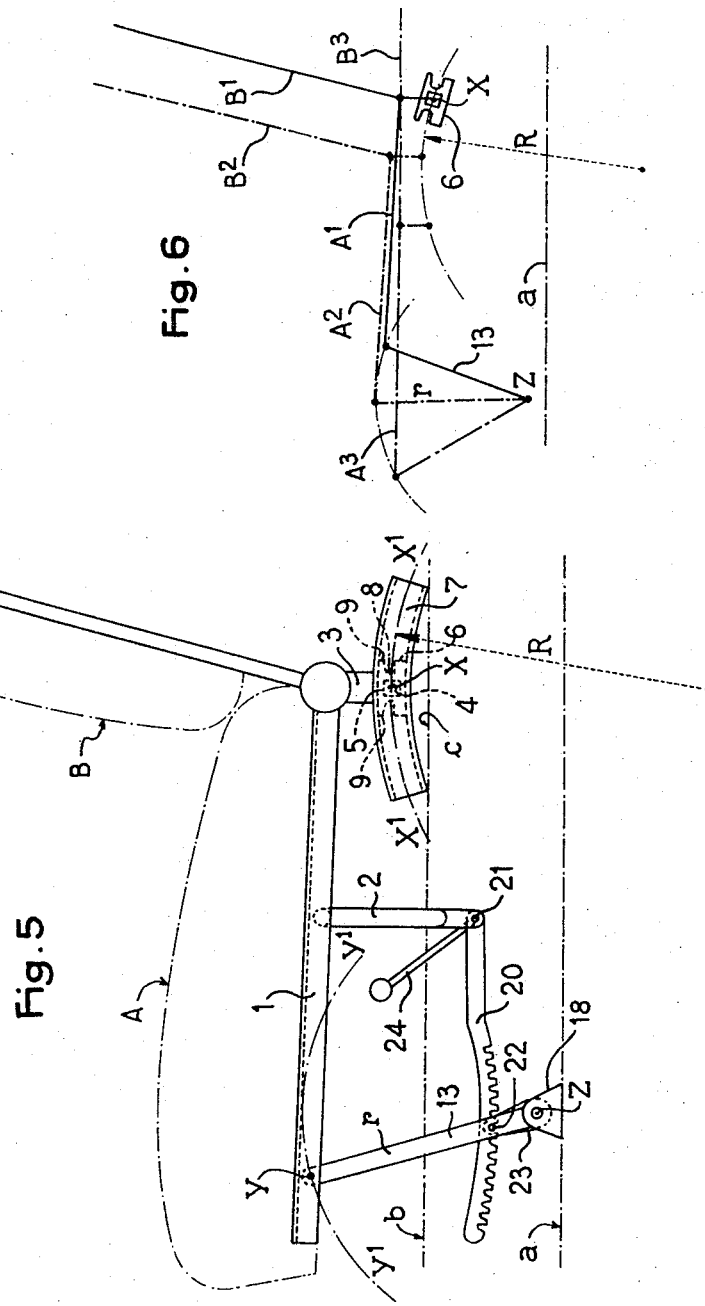

United States Patent Office 3,368,840
Patented Feb. 13, 1968

3,368,840
SEAT UNIT
Marcel Dangauthier, Paris, France, assignor to Societe Industrielle et Commerciale des Automobiles Peugeot, Paris, France, a French body corporate
Filed Oct. 14, 1966, Ser. No. 586,786
Claims priority, application France, Nov. 4, 1965, 37,181
9 Claims. (Cl. 296—65)

ABSTRACT OF THE DISCLOSURE

A unit comprising a seat mounted on a floor by a seat support, the support comprising a frame connected to the floor in the front part of the frame by a lever pivotably connected to the frame and pivotably connected to the floor, the rear part of the frame being connected to the floor by elements slidable in downwardly concave curvilinear fixed guides which afford said elements a path of movement which differs from the part circular path of movement of said pivotal connection between the lever and frame, whereby when the seat is shifted its angular position changes.

---

The present invention relates to seats in particular for automobile vehicles and like machines and more particularly to the supports for said seats.

Vehicle seats are usually connected to the vehicle by slideway means which permit shifting the seat forwardly and rearwardly. The slideways are usually secured to the floor of the vehicle and encumber the latter and in particular diminish the room available for the feet of the passengers located immediately behind the seat. These slideways, whether they be of the sliding or rolling type (balls or rollers), are practically never free from play in the assembly and therefore generate noise and vibrations. They afford only a very limited choice in the manner of shifting the seats (horizontal or slightly inclined shifting) and therefore do not satisfy all requirements. Moreover, they provide a rigid connection between the floor and the seat and consequently transmit all the trembling of the floor. Now, it is difficult to filter by means of the seat itself high-frequency vibrations and the latter are transmitted to the passenger.

The object of the invention is to remedy these drawbacks by an adjustable support for a seat for an automobile vehicle which is also cheaper than conventional supports.

The adjustable seat support according to the invention comprises a frame pivoted at the rear by means of journals having a transverse axis on elements which are movable along fixed guides adapted to be secured at a distance above the floor supporting the seat.

In this way, the rear underside of the seat is free and this increases the space available for the feet and legs of a person seated behind the seat.

According to another feature of the invention, the guides have a curved shape with a downwardly-directed concavity so as to modify the angular position and the height of the cushion and backrest of the seat in accordance with the position of members movable along said guides.

Thus it is easy to obtain:

(a) A lower rear position of the seat cushion with the backrest more inclined for a taller person.

(b) A relatively high intermediate position of the seat cushion with the backrest rather upright for a small person.

(c) A forward lowered position in which the seat forms a bed.

The members movable along the guides can be slides or rollers.

In the case of slides, the latter slide in slideways constituting the guides and are preferably of plastics material and include an automatic device for taking up play. They can moreover slide on said journals, which considerably facilitates the mounting of the slideways.

According to another feature of the invention, the various pivotal connections between the element of the support are achieved by means of rubber or other elastomer and are consequently devoid of play and produce no noise and moreover introduce a certain elasticity in the fixing of the seat which contributes to the filtering of the trembling.

Another object of the invention is to provide a seat unit adjustable on the floor of an automobile vehicle or like machine or a mobile or fixed assembly, the support guides being fixed in a raised position relative to said floor, for example, in the case of an automobile vehicle, one of guides being fixed on the top of one of the longitudinal members of the vehicle and the other on the longitudinally extending tunnel under which the longitudinal transmission shaft extends.

Further features and advantages of the invention will be apparent from the ensuing description with reference to the accompany drawings.

In the drawings:

FIG. 1 is a perspective view of a seat support according to the invention in position on the floor of an automobile vehicle, the seat being shown diagrammatically in thin line and the transverse profile of said floor extending from the right longitudinal member to the axial longitudinal tunnel of the vehicle being shown diagrammatically in dot-dash line;

FIG. 2 is a partially exploded perspective view of a rear slideway, the corresponding slide and the journal therefor;

FIG. 3 is a similar view of one of the upper front pivotal connections;

FIG. 4 is a similar view of the lower front pivotal connection;

FIG. 5 is a diagrammatic side elevational view of the assembly, and

FIG. 6 is a diagram in side elevation showing the three different positions of the seat.

In the illustrated embodiment, the invention is applied to the fixing of a forward right-hand seat to the floor $a$ of an automobile vehicle, the floor being bordered by a raised right longitudinal member $b$ and including a longitudinally extending middle raised portion or tunnel $c$ under which the transmission shaft (not shown) extends.

The seat comprises a seat cushion A, a backrest B capable of being folded back to a horizontal position (bed position) and an adjustable support S.

The support S comprises a frame having longitudinal members 1 interconnected by at least one cross-member 2. At the rear, each member 1 carries a short arm 3 which is integral with the member 1 or rigidly secured thereto by welding. The arm is provided with a transverse journal 4. The two journals 4 are coaxial on a transverse axis X—X.

Transversely and noiselessly slidable on each of the journals 4 in a transverse direction and without play owing to the provision of a bushing or sleeve 5 of rubber or other elastomer, is a slide 6. The two slides 6 are composed of rigid relatively strong plastics material of the polyformol type or of the material known under the trade name "Delrin" for example and each of them slides in a raised slideway 7. The left slideway is secured to the tunnel $c$ and the right slideway to the longitudinal member $b$ either directly or through any suitable fitting.

Each slideway 7 is curved, for example in the form of an arc of a circle, the concave side being downwardly directed and the radius being R (FIG. 6).

Each slideway 7 has a U-shaped cross section. However, the upper flange has a rectilinear section *m n* but the lower flange has a V-shaped section *p, q, r* (FIG. 2) or a dovetailed or like section for the purpose of transversely retaining the slide 6 in the slideway. The slide of course has the same cross section and also comprises two notches 8 which form two lip portions 9. These lip portions rub against the inner face of the upper flange of the slideway. Thus there is no possibility of play between the slide 6 and the journal 4 and the slide and the slideway 7.

In the front part of the unit, the members 1 of the support S are pivoted to coaxial journals 12, by means of eyes 10 having an upper transverse axis Y—Y with the interposition of bushings or sleeves 11 of rubber or other elastomer of the Silentbloc or like type. The journals 12 are rigidly secured to the ends of the branches of a V-shaped lever 13. The apex of the lever is at the lower end and is for example secured to a tube 15 by welding 14 (FIGS. 1 and 4). The tube 15 is mounted to pivot about a lower transverse axis Z—Z, with interposition of bushings or collars 16 of rubber or like material, on two coaxial journals 17 having a common axis Z—Z and carried by a fork-shaped bracket 18 adapted to be secured directly to the floor *a* of the vehicle by screws or bolts extending through apertures 19. This bracket 18 can also be welded to the floor.

The three transverse axes X—X, Y—Y, and Z—Z are parallel and horizontal when the floor *a* is horizontal.

Means are provided for locking the seat in position. It comprises for example a rack 20 pivoted at 21 (FIGS. 1 and 5) to the cross-member 2 and co-operating with a pin 22 carried by a fork 23 which is rigidly secured to the lever 13. The rack 20 can be disengaged by pivoting it upwardly by directly shifting its free forward end or by means of a transverse lever 24 which is rigid therewith.

As will be understood, when the rack 20 is shifted upwardly the support S is capable of being deformed by movement of the members 1 about the axes X—X and Y—Y on the slide 6 and on the lever 13 respectively. The slide 6 moves forwardly or rearwardly in the slideway 7 whereas the lever 13 pivots in the same direction about the axis Z—Z. In short, the axis X—X describes a cylindrical surface represented by the line $X^1$—$X^1$ shown in FIG. 5, this cylindrical surface having a radius R. However, it should be understood that this surface could have any other shape. The axis Y—Y describes a cylindrical surface represented by the line $Y^1$—$Y^1$ in FIG. 5. The radius of curvature R of the arc $X^1$—$X^1$ has been chosen by way of example to be greater than the radius *r* which is equal to the distance between the axes Y—Y and Z—Z.

Thus, the seat can occupy:

(a) A rear position (FIG. 6) in which the cushion is low down and more or less horizontal, at $A^1$, and the backrest fairly inclined, at $B^1$. This position is suitable for a relatively tall person.

(b) A middle position in which the cushion is a little higher, at $A^2$, the backrest is in a more forward position and slightly more upright, at $B^2$. This position is suitable for a shorter person.

(c) A position for a reclining position of the person, in which the cushion has a more forward and lower position, at $A^3$, whereas the backrest is folded rearwardly, at $B^3$.

Apart from the possibility of assuming the three positions just mentioned, the unit comprising the support and seat according to the invention has the following advantages:

The rear under the part of the seat is completely free and open above the floor *a* (see FIGS. 5 and 6).

Noise is avoided owing to the fact that the various pivotal connections are mounted on rubber or like material and to the nature of the slides 7 which take up play by virtue of their lip portions 9.

The mounting is easy since the positions of the slideways 7 are not critical owing to the fact that the slides 6 are slidable on the journals 4 and the lever 13 is mounted on rubber.

Although specific embodiments of the invention have been described, many modifications and changes may be made therein without departing from the scope of the invention as defined in the appended claims.

The slides 6 can be replaced if desired by rollers of rubber or other elastic material which roll directly along arcuate guides on which they rest for example by the effect of gravity. The seat can be locked in the required position by the illustrated mechanism which prevents the lever 13 from rotating with respect to the seat or by a mechanism which holds the lever 13 stationary with respect to the chassis of the vehicle or again by mechanism which holds the frame of the seat stationary with respect to the chassis of the vehicle.

The invention is applicable not only to a seat for an automobile vehicle but for any other vehicle (coach, embarkation, aircraft, etc.) and for any other fixed assembly comprising seats placed one behind the other.

Having now described my invention what I claim as new and desire to secure by Letters Patent is:

1. A unit comprising a seat, a floor and a seat support mounting the seat on the floor, said support comprising in combination a frame having a front part and a rear part, two fixed guides fixed at a distance from the floor but below the seat, journals extending transversely of the support and mounted on the rear part of the frame, elements encompassing the journals and mounted to rotate relative to the journals and engaged with the guides to be movable along the guides in a guided manner, a member adapted to be fixed to the floor, and a lever having at one end a first pivotal connection to said member and at the other end a second pivotal connection to said frame in the front part of the frame, the guides being curvilinear and downwardly concave and affording said elements a path of movement relative to said floor which differs from the part-circular path of movement of said second pivotal connection, whereby, as said lever is pivoted about said member and the seat is shifted thereby, the slope of said seat relative to the horizontal is modified, the pivot axes of said pivotal connections extending transversely of the support and parallel to the axes of said journals.

2. A unit as claimed in claim 1, wherein the guides are slideways and the movable elements are slide structures slidably retained in said slideways.

3. A unit as claimed in claim 2, wherein the slide structures have lip portions resiliently engaging the slideways for taking up play between the slideways and the slide structures.

4. A unit as claimed in claim 3, wherein the slide structures are rotatable and axially slidable on said journals.

5. A unit as claimed in claim 2, wherein each slideway is a flanged structure having a substantially V-shaped bottom wall engaging a substantially V-shaped bottom face of the corresponding slide structure.

6. A unit as claimed in claim 1, wherein said lever is V-shaped transversely of the support, the apex of the V-shaped lever being pivoted to said member.

7. A unit as claimed in claim 1, wherein said pivotal connections include an elastomer bushing between said lever and said member and an elastomer bushing between said lever and said frame and said elements are rotatably mounted on said journals with interposition of an elastomer bushing.

8. A unit as claimed in claim 1, wherein the guides are fixed in a position closer to a horizontal plane intersecting said second pivotal connection than to a horizontal plane intersecting said first pivotal connection.

9. A unit as claimed in claim 1, wherein the floor is the floor of a automobile vehicle comprising two longitudinal members and a longitudinal tunnel located between the longitudinal members and under which the longitudinal transmission shaft of the vehicle extends, one of said guides being fixed to the top of one of said longitudinal members whereas the other guide is fixed to said tunnel.

References Cited

UNITED STATES PATENTS

| | | | |
|---|---|---|---|
| 2,225,074 | 12/1940 | Miller | 248—429 |
| 2,576,365 | 11/1951 | Scott et al. | 248—424 |
| 2,600,886 | 6/1952 | Korner | 248—420 |
| 2,871,085 | 1/1959 | Diack | 308—3.8 |
| 3,007,668 | 11/1961 | Dall | 248—429 |
| 3,170,728 | 2/1965 | Barenyi | 248—424 |

FOREIGN PATENTS 525,989  9/1940  Great Britain.

BENJAMIN HERSH, *Primary Examiner.*

J. H. BRANNEN, L. D. MORRIS, *Assistant Examiners.*